(12) United States Patent
Derraugh

(10) Patent No.: US 10,905,969 B2
(45) Date of Patent: Feb. 2, 2021

(54) BOOK WITH INTEGRAL MECHANICAL SOUND PRODUCING COMPONENT

(71) Applicant: William Derraugh, Donaghadee (IE)

(72) Inventor: William Derraugh, Donaghadee (IE)

( * ) Notice: Subject to any disclaimer, the term of this patent is extended or adjusted under 35 U.S.C. 154(b) by 0 days.

(21) Appl. No.: 16/751,016

(22) Filed: Jan. 23, 2020

(65) Prior Publication Data

US 2020/0330896 A1 Oct. 22, 2020

Related U.S. Application Data

(60) Provisional application No. 62/836,567, filed on Apr. 19, 2019.

(51) Int. Cl.
*A63H 33/38* (2006.01)
*B42D 1/00* (2006.01)
*G09B 5/04* (2006.01)

(52) U.S. Cl.
CPC ............ *A63H 33/38* (2013.01); *B42D 1/009* (2013.01); *G09B 5/04* (2013.01)

(58) Field of Classification Search
CPC .................................................... A63H 33/38
USPC ................ 446/147–148; 40/124.03, 455
See application file for complete search history.

(56) References Cited

U.S. PATENT DOCUMENTS

| | | | | |
|---|---|---|---|---|
| 2,027,889 A | * | 1/1936 | Stewart ................ | B42D 5/006 281/15.1 |
| 3,092,927 A | * | 6/1963 | Luchsinger .......... | B42D 15/022 446/397 |
| 3,594,937 A | * | 7/1971 | Luchsinger ............ | B42D 15/04 40/124.03 |
| 6,525,706 B1 | | 2/2003 | Rehkemper et al. | |
| 6,821,182 B2 | * | 11/2004 | Polick ..................... | G09B 1/00 281/15.1 |
| 2015/0224808 A1 | * | 8/2015 | Shlonsky ............. | B42D 15/027 40/124.03 |

FOREIGN PATENT DOCUMENTS

EP 0609048 A1 8/1994

* cited by examiner

*Primary Examiner* — Kyle R Grabowski
(74) *Attorney, Agent, or Firm* — Tope-McKay & Associates

(57) ABSTRACT

The present invention relates to children's books and, more particularly, to a book with a mechanical sound producing component that is integral to the book. The book includes at least one page having a page frame component and a movable page component that is movable with respect to the page frame component. A movable sound producing component is attached with one or both of the page frame component and the movable page component, such that the movable sound producing component is positioned between the page frame component and the movable page component. The movable sound producing component is movable with respect to the page frame component, such that movement of the movable sound producing component causes the movable sound producing component to movably engage with one or both of the page frame component and the movable page component to create a mechanically produced sound.

7 Claims, 7 Drawing Sheets

BOOK WITH INTEGRAL MECHANICAL SOUND PRODUCING COMPONENT

CROSS-REFERENCE TO RELATED APPLICATIONS

The present application is also a Non-Provisional Application of U.S. Provisional Application No. 62/836,567, filed in the United States on Apr. 19, 2019, entitled, "Book with Integral Mechanical Sound Producing Component," the entirety of which is incorporated herein by reference.

BACKGROUND OF THE INVENTION

(1) Field of Invention

The present invention relates to children's books and, more particularly, to a book with a mechanical sound producing component that is integral to the book.

(2) Description of Related Art

This disclosure is directed to the field of sound generating books. In the art there are books that have components that generate a various of sounds. The sound producing components in the prior art are either electronic (e.g., a push button), or operate independently of the book, such as a squeaker. For example, a squeaker will squeak regardless of its attachment to the book. Nothing heretofore devised includes a mechanical sound producing component that is integrally formed with the book.

Thus, a continuing need exists for a book with an integrally formed mechanical sound producing component.

SUMMARY OF INVENTION

The present invention relates to children's books and, more particularly, to a book with a mechanical sound producing component that is integral to the book. The book comprises at least one page in the book, the page including a page frame component and a movable page component that is movable with respect to the page frame component. A movable sound producing component is attached with at least one of the page frame component or the movable page component, such that the movable sound producing component is positioned between the page frame component and the movable page component. The movable sound producing component is movable with respect to the page frame component, such that movement of the movable sound producing component causes the movable sound producing component to movably engage with at least one of the page frame component or the movable page component to create a mechanically produced sound.

In another aspect, the movable page component is formed to slide with respect to the page frame component.

In another aspect, the movable page component is formed to rotate with respect to the page frame component.

In another aspect, the movable page component comprises a plurality of teeth along at least one edge of the movable page component formed to engage with the movable sound producing component.

In another aspect, the movable sound producing component is an element comprising at least one of a plastic material and a metal material attached with the page frame component.

In another aspect, the movable page component comprises a handle.

In another aspect, at least a portion of the page frame component is formed to engage with at least a portion of the movable page component.

In another aspect, the page frame component comprises a plurality of teeth along at least one edge of the page frame component formed to engage with the movable sound producing component.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
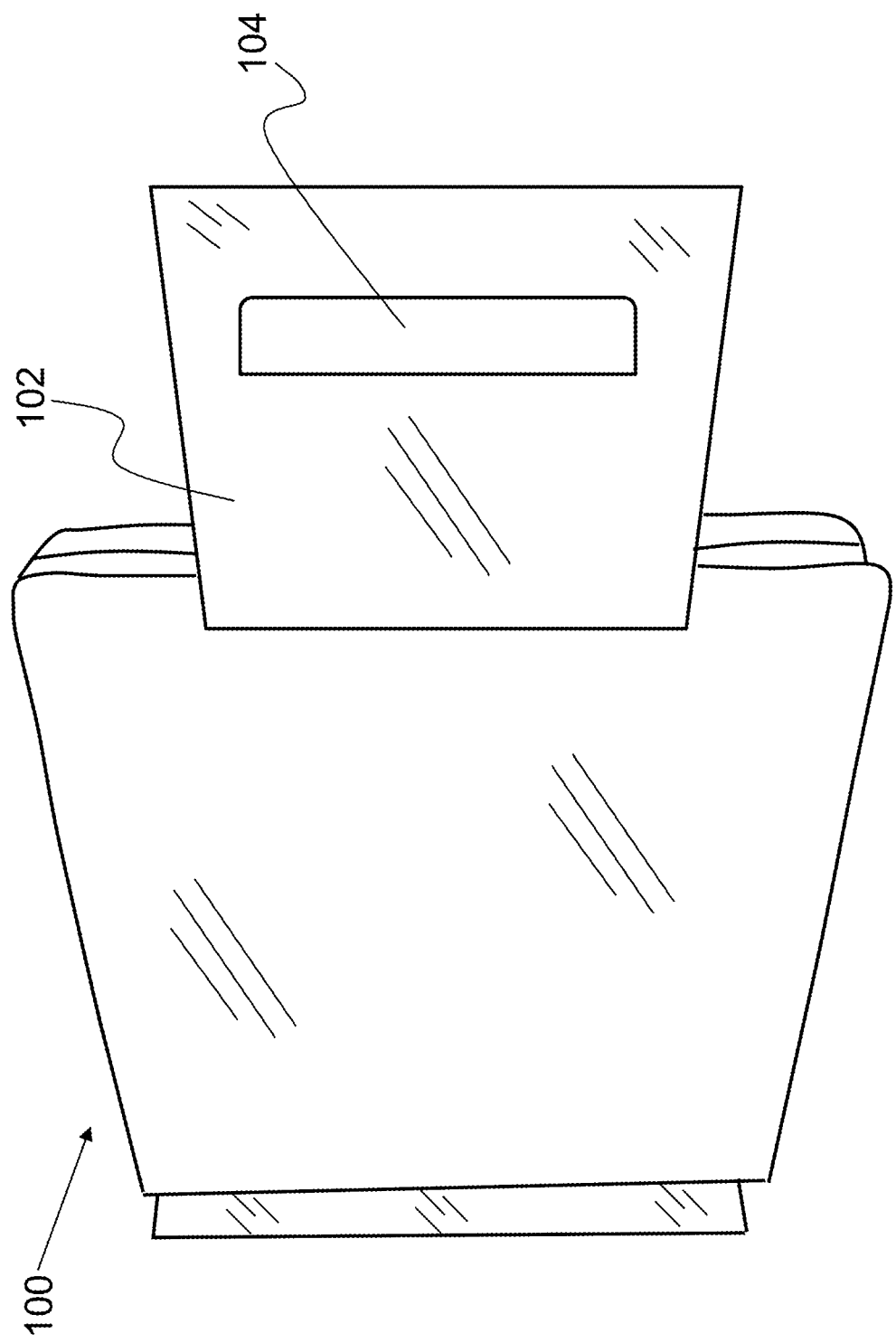
FIG. 1 is an illustration of a book having a movable page component according to some embodiments of the present disclosure.

The present invention relates to children's books and, more particularly, to a book with a mechanical sound producing component that is integral to the book. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

This disclosure is directed to a book with a mechanical sound producing component that is integral to the book. For example, the book includes a mechanical and movable sound producing component that generates a mechanical clicking noise (or other desired noise) when a part of it is turned, pulled, slid, rotated, or otherwise moved. Note that although the sound producing component is specifically described with respect to making noise between a page frame component and a movable page component, it should be understood that the invention is not intended to be limited thereto as the movable page component and its sound producing component can reversibly engage with any portion of the book, including the cover, that includes a part to otherwise engage with and make sound with the sound producing component.

FIG. 1 illustrates one embodiment of the book 100 having at least one page comprising a movable page component 102, where the movable page component has been slid laterally to extend out of the book 100. An aperture 104 within the movable page component 102 forms a handle at the end of the movable page component 102. The aperture 104 allows a user to easily grasp and pull the movable page component 102, causing the movable page component 102 to slide laterally within the book 100 and make a sound, which will be described in detail below.

Figure 2:
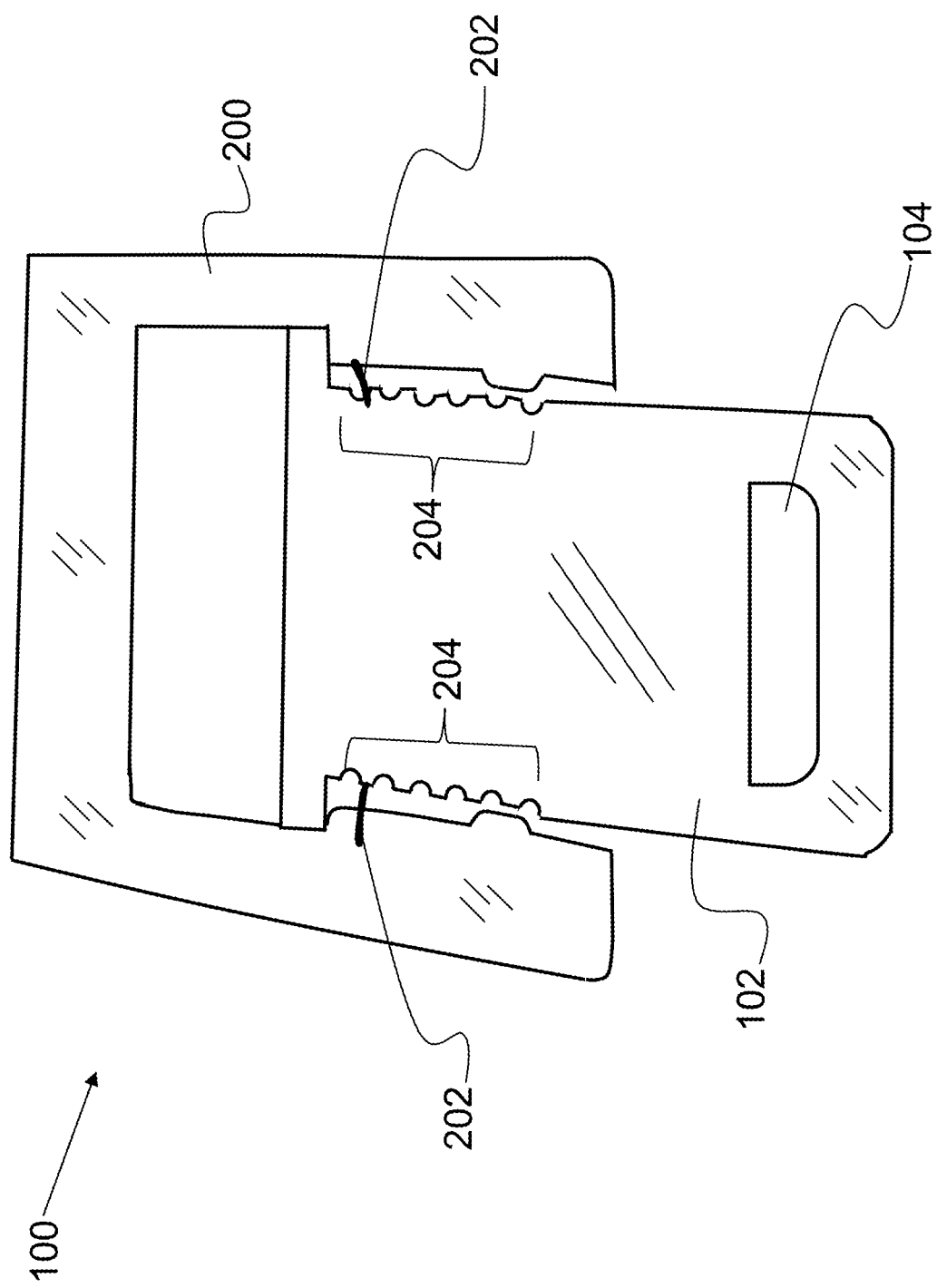
FIG. 2 is an illustration of the interior of the book according to some embodiments of the present disclosure.

FIG. 2 shows an interior view of the book 100. As shown, each page in the book 100 is comprised of a page frame component 200 that is affixed within the book 100, such as a turnable leaf within a book 100. The movable page component 102 is attached with the page frame component 200 such that the movable page component can turn, slide, or move in any other manner with respect to the page frame component 200. Each page of the book comprising a page frame component 200 and a movable page component 102 can be turned like a traditional book page, but the page frame component 200 remains fixed relative to the movable page component 102.

Formed between the movable page component 102 and the page frame component 200 is a movable sound producing component 202 that mechanically generates a sound when the movable page component 102 and the movable sound producing component 202 is moved with respect to the page frame component 200. The movable sound producing component 202 is attached with at least one of the page frame component 200 or the movable page component 102 such that the movable sound producing component 202 is positioned between the page frame component 200 and the movable page component 102. In one embodiment, the movable sound producing component 202 is attached with the movable page component 102 and mechanically engages with at least a portion of the page frame component 200 to cause a mechanical clicking noise (or any other noise as applicable to the particular component). In another embodiment, the movable sound producing component 202 is attached with the page frame component 200 and mechanically engages with at least a portion of the movable page component 102. Furthermore, in one embodiment of the invention, the movable page component 102 comprises a plurality of teeth 204 (or small indentations) in a series. The teeth 204 can be formed on a single edge of the movable page component 102, or on more than one edge of the movable page component 102, as depicted in FIG. 2.

In the embodiment illustrated in FIG. 2, the page frame component 200 comprises a thin element fixedly attached with the page frame component 200, which acts as the movable sound producing component 202. The movable sound producing component 202 is comprised of a plastic material, a metal material, or a combination of plastic and metal materials (or any other suitable material). The movable sound producing component 202 can be comprised of a flexible, yet hard and durable, plastic and/or metal material (or other material) that can flex with respect to the page frame component 200. The sound producing component 202 is attached with the page frame component via any suitable means or mechanism, non-limiting examples of which include glue, press-fit mechanism, tape, and screws. By pulling/sliding the movable page component 102 into and out of the book 100, the plastic/metal element/sound producing component 202 clicks between each of the teeth 204 as the movable page component 102 is slid out from the book 100.

Figure 3:
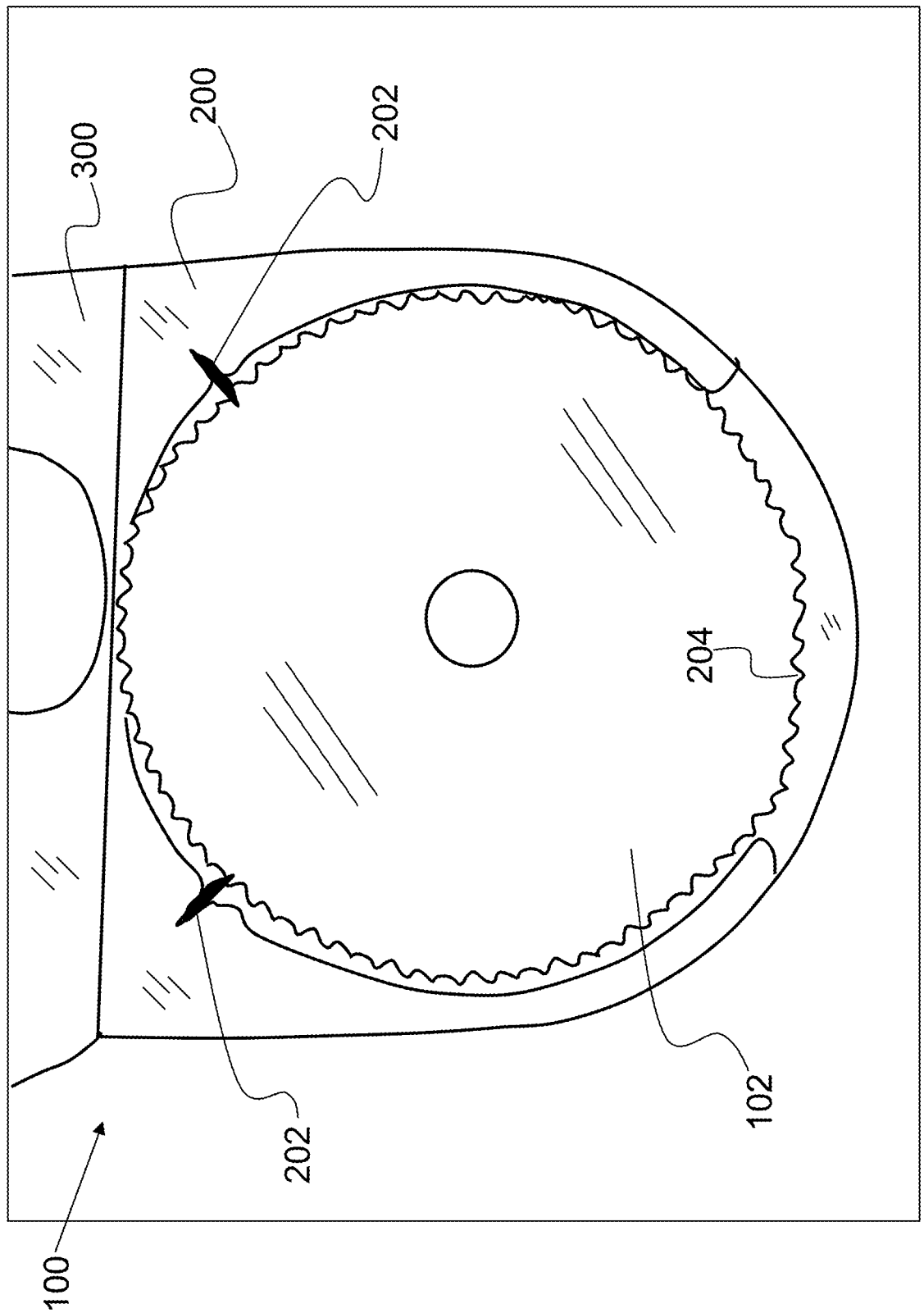
FIG. 3 is an illustration of the book according to some embodiments of the present disclosure in an open configuration, showing the movable page component as a wheel and the sound producing component.
Figure 4:
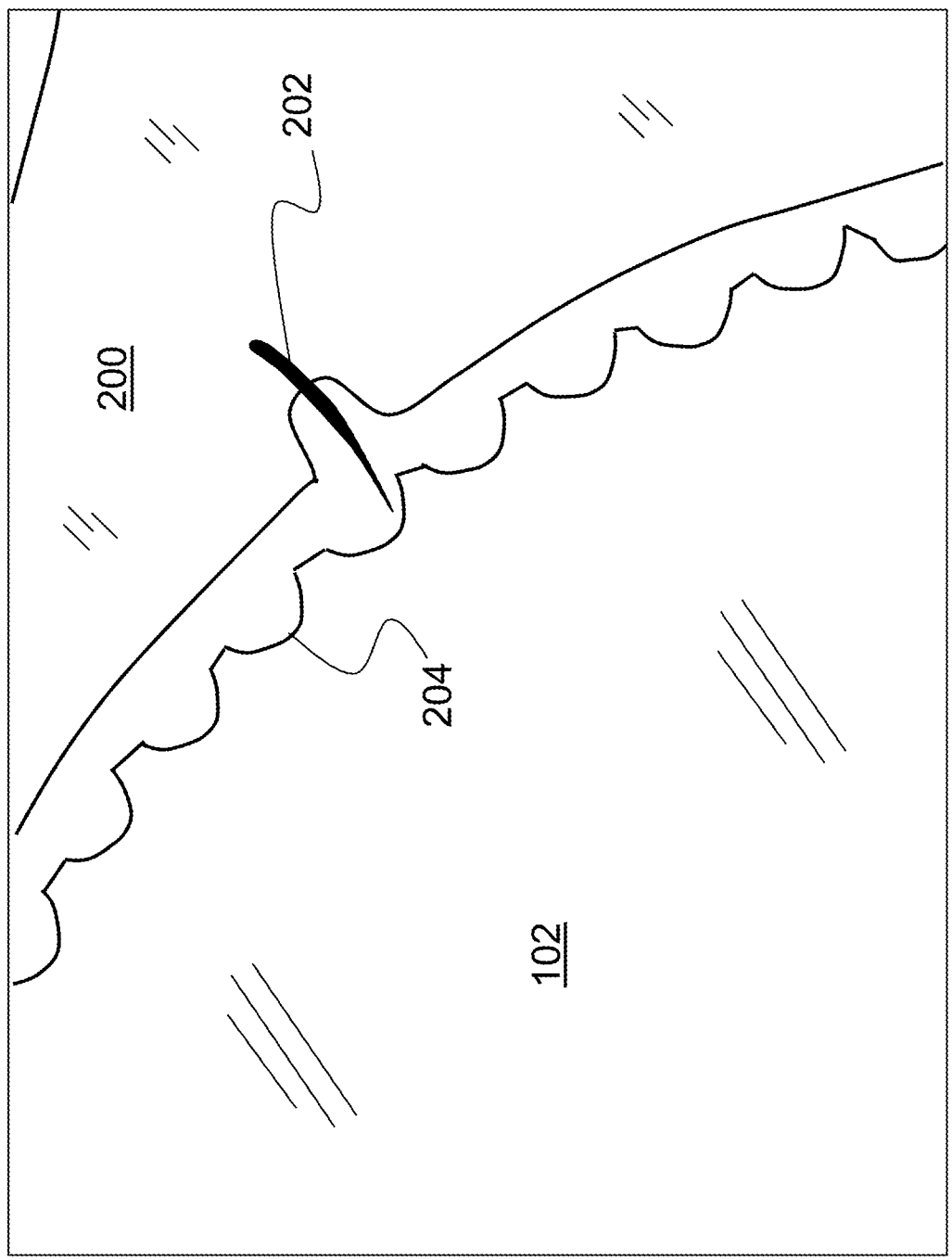
FIG. 4 is an enlarged view illustration of the book according to some embodiments of the present disclosure in an open configuration, showing the movable page component as the wheel and the sound producing component.

In an embodiment shown in FIG. 3, the movable page component 102 is a wheel that rotates freely and is implanted in the middle of the book 100. The book 100 further comprises a cover 300, depicted in FIG. 3 in the open configuration with the cover 300 lifted away from the movable page component 102. The wheel has teeth 204 formed by a series of indentations along at least a portion of its edge. FIG. 4 depicts an enlarged view of a portion of the embodiments depicted in FIG. 3. The movable page component 102 rotates with respect to the page frame component 200 within one of the turnable leaves, which is extra thick to allow for the free rotation. As with the embodiment illustrated in FIG. 3, the movable sound producing component 202 is a thin plastic or metal (or a combination of both materials) element (e.g., stick) secured to the page frame component 200 in such a way that as the wheel (i.e., movable page component 102) is turned, the stick (i.e., sound producing component 202) falls into each of the teeth 204 in the wheel (movable page component 102), causing a click-click sound as the wheel (movable page component 102) is turned. Thus, the movable sound producing component 202 in this embodiment is the stick in conjunction with the teeth 204. This version can be referred to as "Wheelies".

Figure 5:
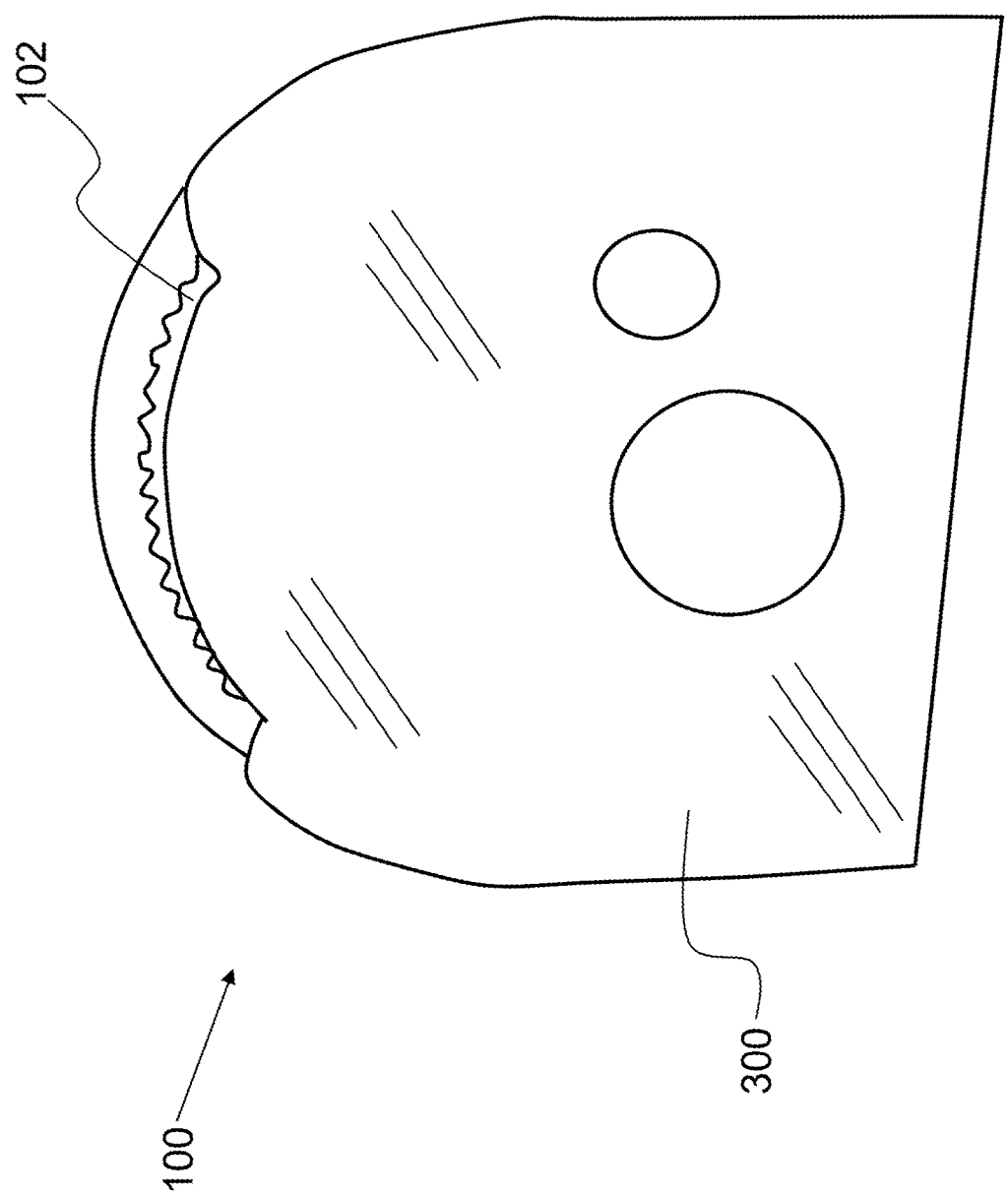
FIG. 5 is an illustration of the book depicted in FIGS. 3 and 4 in a closed configuration according to some embodiments of the present disclosure.
Figure 6:
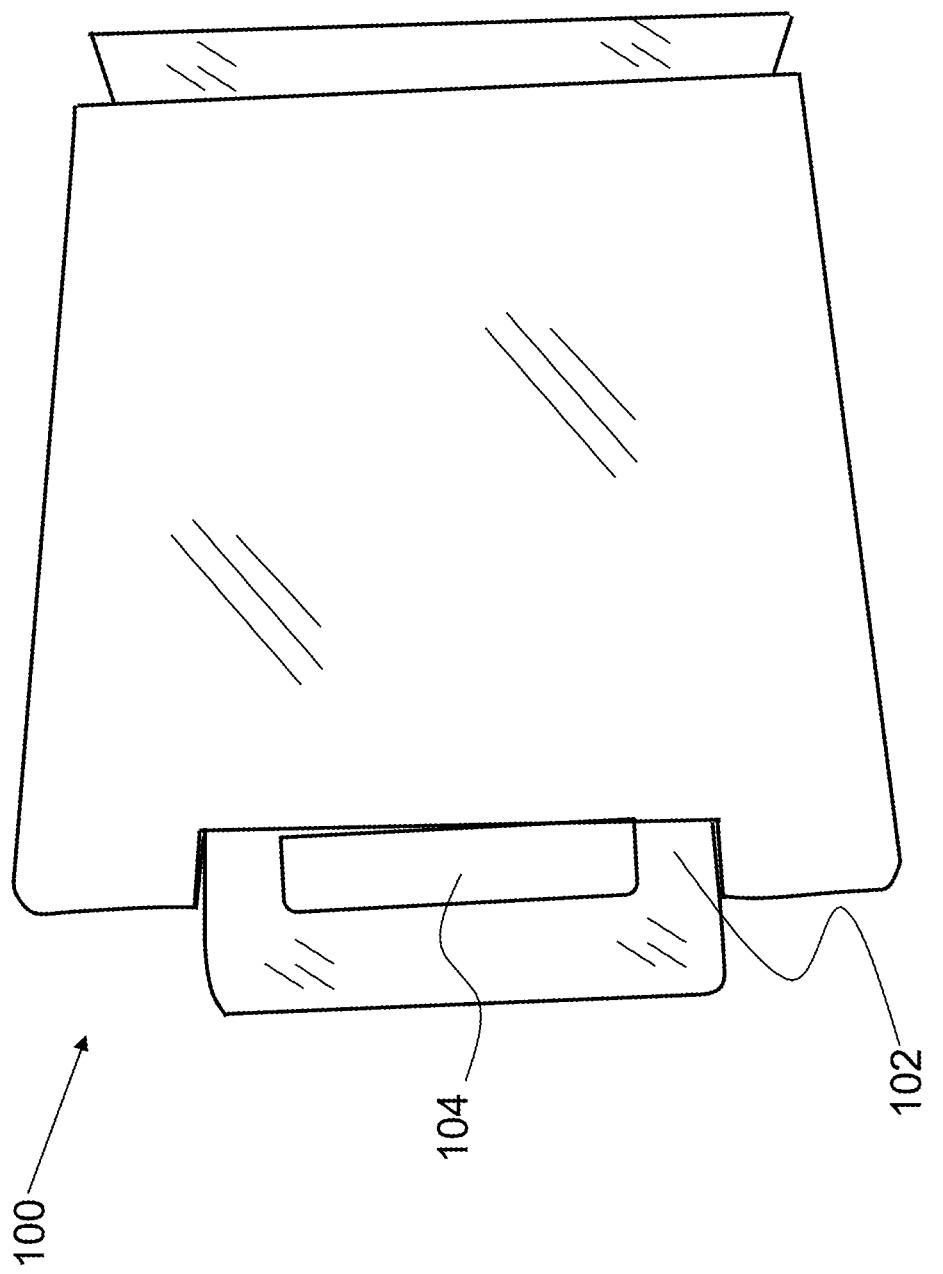
FIG. 6 is an illustration of the book depicted in FIGS. 1 and 2 in a closed configuration according to some embodiments of the present disclosure.

FIG. 5 illustrates the embodiment of the book 100 depicted in FIGS. 3 and 4 in a closed configuration. In the closed configuration, the cover 300 is shown stacked on top of the one or more pages of the book 100. Although not shown, the book 100 can also comprise a back cover such that the pages of the book 100 are positioned between the cover 300 and the back cover like a traditional book. FIG. 6 illustrates the embodiment of the book 100 depicted in FIGS. 1 and 2 in a closed configuration. As can be appreciated by one skilled in the art, there are a number of other formats in which such a configuration can be implemented.

Figure 7:
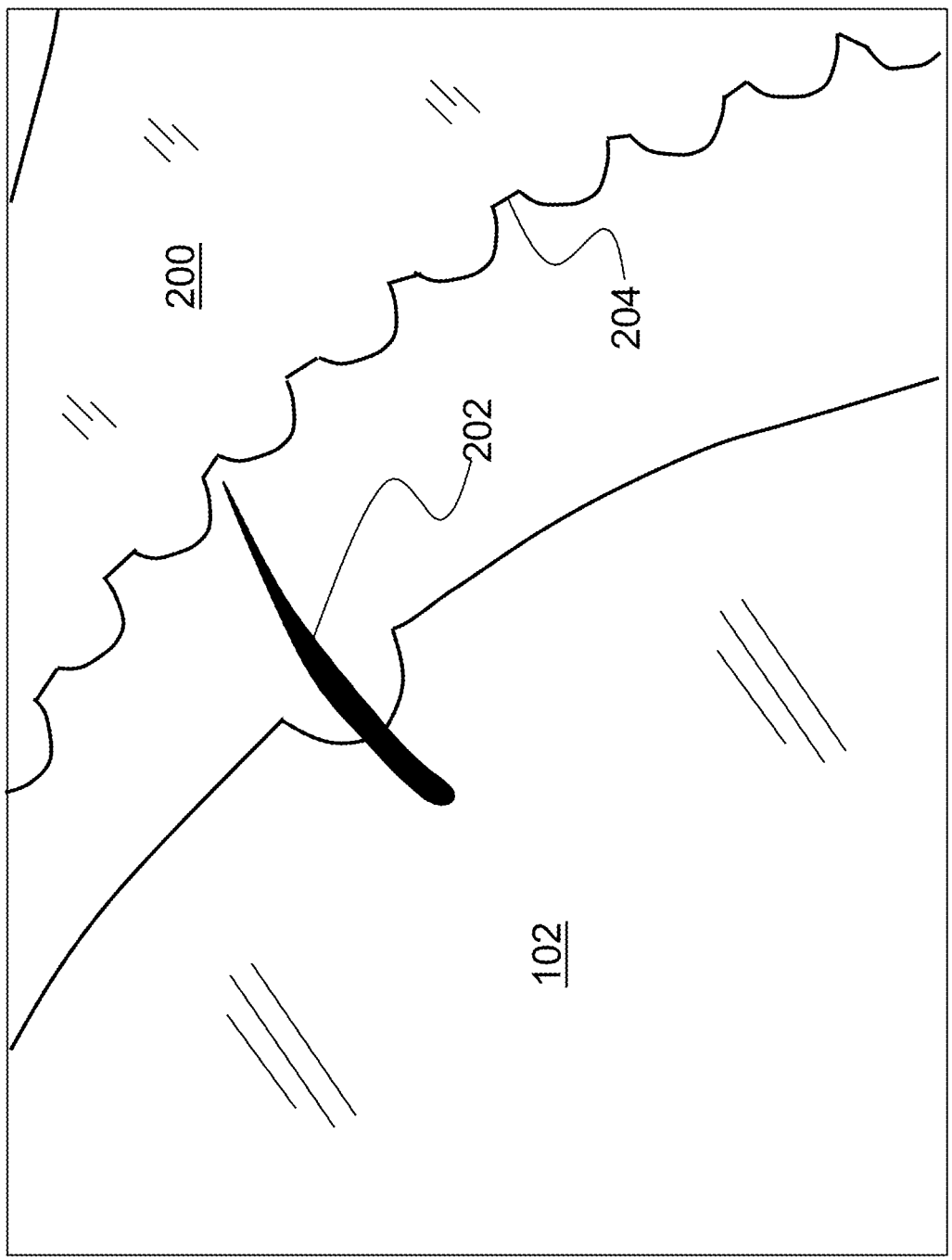
FIG. 7 is an enlarged view illustration of the book according to some embodiments of the present disclosure in an open configuration, showing the sound producing component attached with the movable page component.

FIG. 7 depicts an embodiment of the invention in which the movable sound producing component 202 is attached with the movable page component 102. In this embodiment, the page frame component 200 comprises a plurality of teeth 204 to engage with the movable sound producing component 202. As can be appreciated by one skilled in the art, the movable sound producing component can be attached with one or both of the movable page component 102 and the page frame component 200 provided that the movable sound producing component 202 is positioned between the page frame component 200 and the movable page component 102, such that movement of the movable sound producing component 202 causes the movable sound producing component 202 to movably engage with at least one of the page frame component 200 or the movable page component 102 to create a mechanically produced sound.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A book with an integral mechanical sound producing component, comprising:

at least one page in the book, the page including a page frame component and a movable page component having teeth that is movable with respect to the page frame component, a movable sound producing component attached with at least one of the page frame component or the movable page component such that the movable sound producing component is positioned between the page frame component and the movable page component; and wherein the movable sound producing component is flexibly movable such that movement of the movable sound producing component causes the flexibly movable sound producing component to flex and bend when engaging with the teeth of at least one of the page frame component or the movable page component to fall into each of the teeth and create a mechanically produced clicking sound.

2. The book as set forth in claim 1, wherein the movable page component is formed to slide with respect to the page frame component.

3. The book as set forth in claim 1, wherein the movable page component is formed to rotate with respect to the page frame component.

4. The book as set forth in claim 1, wherein the movable page component comprises a plurality of teeth along at least one edge of the movable page component formed to engage with the movable sound producing component.

5. The book as set forth in claim 4, wherein the movable sound producing component is an element comprising at least one of a plastic material and a metal material attached with the fixed page frame component.

6. The book as set forth in claim 1, wherein the movable page component comprises a handle.

7. The book as set forth in claim 1, wherein at least a portion of the page frame component is formed to engage with at least a portion of the movable page component.

\* \* \* \* \*